Jan. 22, 1929.  
W. OLIEMAN  
1,699,909  
MACHINE FOR SORTING FRUIT, VEGETABLES, AND PRODUCTS OF LIKE NATURE  
Filed March 9, 1926
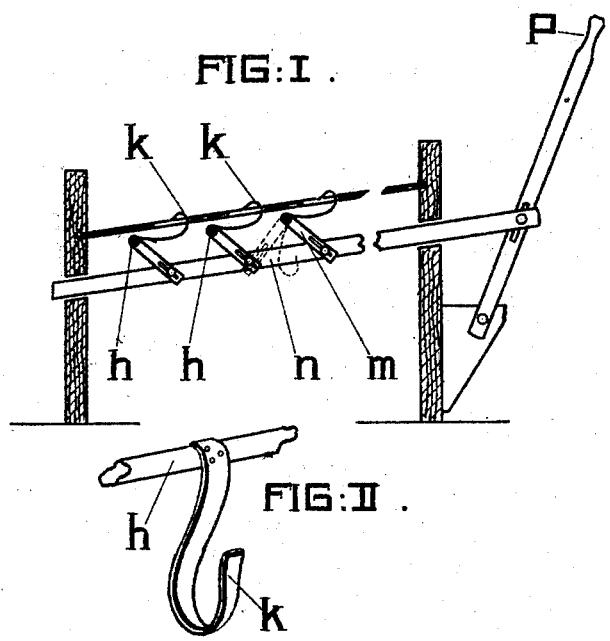
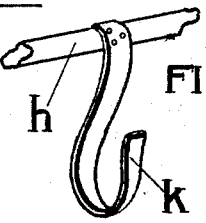
W. Olieman  
INVENTOR
By: Marks & Clerk  
Attys Patented Jan. 22, 1929.

1,699,909

UNITED STATES PATENT OFFICE.

WILLEM OLIEMAN, OF GEMEENTE PIJNACKER, NETHERLANDS.

MACHINE FOR SORTING FRUIT, VEGETABLES, AND PRODUCTS OF LIKE NATURE.

Application filed March 9, 1926, Serial No. 93,505, and in the Netherlands March 13, 1925.

Devices for sorting fruit are already known which comprise an inclined sorting tray or table provided with a certain number of sorting apertures which increase in size from the top to the bottom of the tray.

In these known machines, the fruit is kept in motion either by shaking the sorting table or by means of a member which moves upwards and downwards through all the apertures situated in one row and through slots which, formed in the sorting table, connect the apertures.

The latter arrangement presents the disadvantage that when the movement of the lath-shaped member which is raised, takes place, the fruit is often crushed between the sorting table and this member, and is bruised or broken, particularly during moments when the fruit falls through the apertures and when the member again moves upwards. Especially in the case of soft fruit, such as tomatoes, for which these machines are in fact employed to a great extent, the efficiency of the machine is greatly reduced.

The present invention relates to a sorting device for fruit, vegetables and products of like nature, which obviates the disadvantages mentioned above and which presents the feature that in proximity to each sorting aperture is placed a separate elastic member which is adapted to move in such a way that when the machine is working, each elastic member enters by moving upwards, into its aperture, while the fruit, which is larger than the aperture and, which happens to be above the latter, is displaced, the member then once more disengaging the aperture and the space beneath it so as to allow a fruit of smaller size than the aperture to fall freely through the latter.

The advantage of this construction consists in the fact that each elastic member need only be of sufficient strength to be capable of carrying a single fruit so that when the fruit happens to become jammed the member is not sufficiently stiff to cause damage to be done to the fruit.

As the working apertures increase in size as the distance of these apertures from the top of the table increases, so that the weight of the fruit to be raised above each of them increases in proportion, the elastic members are given an increased stiffness to correspond with the increasing size of the apertures with which they co-operate.

Further, it is desired that the space situated beneath each sorting aperture becomes periodically completely free while the distance between the lower face of the sorting table and the base of the receiving vat is reduced to a minimum, thus also reducing by as much as possible the risk of damage to the fruit or the like.

To obtain this, according to the invention, near each aperture is placed a pivot to which is attached an elastic arm, which latter has such a form that when the pivot turns the arm enters into the aperture by moving upwards, so that any piece of fruit which happens to be above the aperture and which is too large to pass therethrough is raised (preferably from the back or side nearest the top of the table), by the arm which then returns backwards, turning in the aperture so as to become placed upon the side of the latter.

The pivots in question are preferably placed transversely to the sorting table and near the lower edge of the corresponding aperture. By making the elastic arm of curved shape, it is easy to arrange that, as a consequence of the rotation of the pivot, each arm will seize the fruit from the back and move it in the direction of the lower edge of the sorting table.

The accompanying drawings illustrate by way of example a form of the invention.

In these drawings:

Figure 1 is a vertical section through a fruit sorting apparatus in which a certain number of elastic bodies are mounted upon pivots.

Figure 2 is a perspective view of such a pivot with the elastic arm attached to it.

Figure 1 shows a part of the sorting table beneath which are placed the pivots $h$ upon the side of each horizontal row of apertures. To these pivots $h$ are attached the curved elastic arms $k$.

Each pivot is also at one side of the sorting table, provided with an arm $m$ which engages by means of a slot upon a round stud or the like member mounted upon the rod $n$ which is given a to and fro motion by means of the hand lever $p$. Each arm $k$ is thus adapted to raise the fruit, which rests over a corresponding aperture, by pushing the fruit at its upper end and thereby giving it an impulse in the direction of the lower end of the sorting table. These ejecting arms being elastic and having a curved shape, they bend back when fruit falls upon them during their return movement, giving way so that the fruit is not crushed but falls free.

The oscillatory movement of the spindles $h$ may be obtained in any desired manner.

The form described above has already proved in practice that it completely obviates all the damage or breakage which occurs in machines employed at the present time.

What I claim is:

1. A device for sorting fruit, vegetables and products of like nature comprising in combination an inclined stationary sorting table having a number of apertures the sizes of which increase according as the distances from the upper end of the table increase, pivots placed near the apertures, separate members each formed of a curved elastic arm attached to a pivot below and somewhat beyond the lower end of the corresponding aperture in such manner that in its upward movement the arm enters the aperture and pushes the fruit which is too large to pass through the aperture, at its upper end giving same an impulse in the direction of the lower end of the sorting table, and after downward movement giving free passage for the falling fruit and operative mechanism attached to said pivots.

2. A sorting device as claimed in claim 1, wherein the operative mechanism comprises arms that oscillate on said pivots, a rod for oscillating the said arms and a lever device for oscillating said rod.

In testimony whereof I have signed my name to this specification.

WILLEM OLIEMAN.